United States Patent [19]

Finch et al.

[11] Patent Number: 5,542,105

[45] Date of Patent: Jul. 30, 1996

[54] POSITION SENSE RADIO CARRY CASE APPARATUS AND METHOD OF USING SAME

[75] Inventors: Steven J. Finch, Plantation; Roger G. Higgins, Sunrise; Paul L. Pierson, Ft. Lauderdale, all of Fla.

[73] Assignee: Motorola, Inc., Schaumburg, Ill.

[21] Appl. No.: 283,321

[22] Filed: Oct. 7, 1994

[51] Int. Cl.⁶ .................................................. H04B 1/40
[52] U.S. Cl. ........................ 455/89; 455/90; 455/351
[58] Field of Search ................. 155/89, 90, 347–351; 379/61, 420, 422, 424, 426, 428, 440

[56] References Cited

U.S. PATENT DOCUMENTS

| | | |
|---|---|---|
| 3,611,140 | 10/1971 | Shimada . |
| 3,659,050 | 4/1972 | Carlsson et al. . |
| 4,178,488 | 12/1979 | Nishihata . |
| 4,325,142 | 4/1982 | Nakazawa ........................... 455/351 X |
| 4,495,652 | 1/1985 | Leslie . |
| 4,647,722 | 3/1987 | Nishida et al. . |
| 4,845,772 | 7/1989 | Metroka et al. . |
| 4,984,295 | 1/1991 | Engstrom et al. . |
| 5,175,869 | 12/1992 | Murata ................................... 455/89 X |
| 5,276,916 | 1/1994 | Pawlish et al. . |

FOREIGN PATENT DOCUMENTS 2215163 9/1989 United Kingdom .

*Primary Examiner*—Chi H. Pham
*Attorney, Agent, or Firm*—Frank M. Scutch, III

[57] ABSTRACT

A device used with a portable radio (10) and associated carrying case (30) which can automatically adjust radio control functions such as audio output, DTMF tone level mode telephone hang-up or illumination levels of the radio depending on the radio's position in relation to the carrying case. The radio (10) includes a hall effect switch (14) used to signal the a microprocessor within the radio when actuated. A magnet (38) located within the case (30) actuates the hall effect switch (14) when the radio (10) is placed within the case (30). The microprocessor is then signaled to change radio function aiding the user in the operation of the radio (10) depending on the its position.

13 Claims, 2 Drawing Sheets

POSITION SENSE RADIO CARRY CASE APPARATUS AND METHOD OF USING SAME

TECHNICAL FIELD

This invention relates in general to portable radios and more particularly automatically controlling radio functions.

BACKGROUND

Portable radio equipment, particularly those capable of interfacing into the telephone system, require various control or functional changes depending on the mode of operation. For example, there are many instances when the audio coming from the radio needs to be of greater strength due to the physical distance of the radio's speaker from the user. If worn on the belt, the audio would be required to be louder than when at the user's ear. Safety is an additional consideration. When using a radio in a dispatch mode, very loud audio may be required to alert a user if the radio is worn away from the ear i.e. on the hip. When the radio is used near the face, these high audio levels would no longer be required and may actually be damaging if in close proximity to the ear. In this instance, it would be desirable for the unit to automatically convert to a low audio condition for telephone interconnect or low audio dispatch.

Many techniques have been employed which work to reduce the audio level in various situations. These include heat detection and proximity detection which most often are unreliable and costly to implement. Other techniques such as those disclosed in U.S. Pat. Nos. 4,845,772 and 5,276,916 are used with "flip" type cellular telephones. The former uses a hook switch to detect when the flip portion of the radio is extended or retracted. The latter controls the audio output depending on the position of the flip assembly. Until now, only cellular telephones or radios which include these types of flip assemblies have used these techniques. Radios without the flip assembly were not configured to include a switch and therefore could not control any the radio's control functions in specialized situations.

Therefore, the need exits to provide a means by which various radio functions such as audio level, DTMF tone level, light brightness, telephone hang-up or mode of operation can be easily switched and/or controlled depending on the user conditions. The apparatus should be easy to use and inexpensive to incorporate into the radio. The device should have little or no moving parts to insure simple operation and avoid maintenance difficulties.

DETAILED DESCRIPTION OF THE PREFERRED EMBODIMENT

Figure 1:
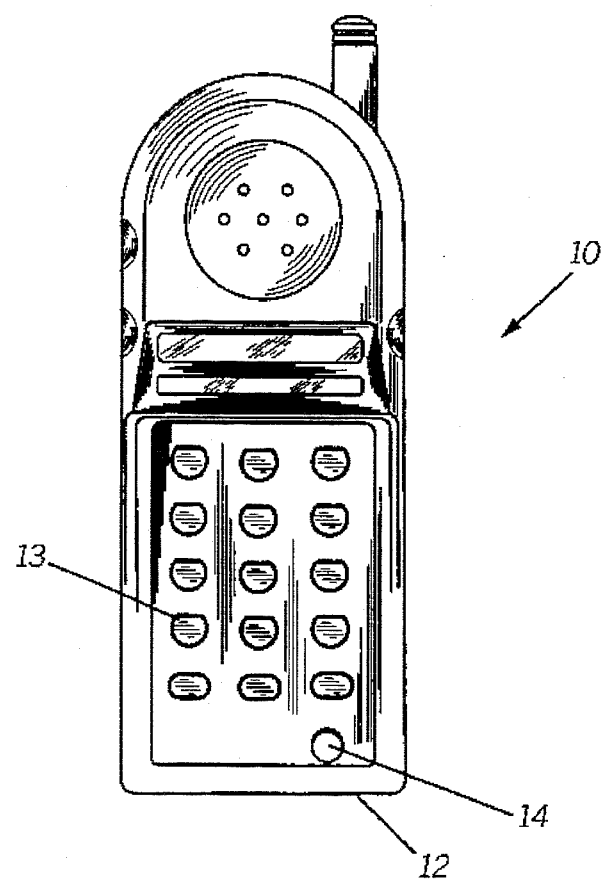
FIG. 1 is an isometric view of a radio which incorporates a hall effect switch which is used with its audio portion.

Referring now to FIG. 1, a portable radio is shown generally at 10. The radio includes a housing 12 and various switches, buttons and displays to allow the user to operate the radio's options and features. A DTMF tone pad 13 allows the radio to interface with a telephone system. Included within the housing 12 is a hall effect switch 14. As is known in the art, hall effect switch 14 is a semiconductor device and opens when a magnetic field is applied across a current carrying material within the device. This acts to force the moving carriers to crowd to one side of the switch conductors where an electric field develops as a result of this crowding. An example of a typical hall effect switch which may be used in the invention in Sprague Ser. No. 51R05469E52 or the like. Within the radio, hall effect switch 14 is attached to a microprocessor. The microprocessor ultimately controls the functions of the radio such as level of audio output emitted by the radio speaker, audio level emitted by the DTMF tone pad 13, mode of operation, phone hang up and light brightness.

Figure 2:
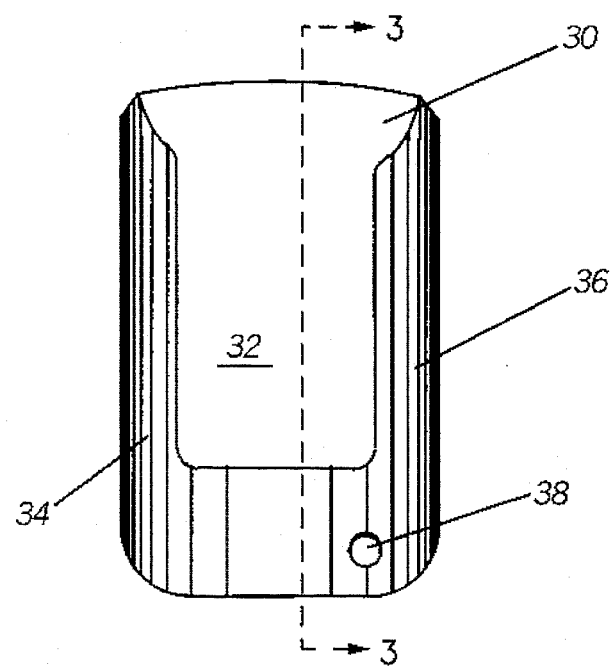
FIG. 2 is an isometric view of the carrying case used with the radio in FIG. 1.

FIG. 2 shows the carrying case 30 which provides a means to hold and transport the radio 10 by a user. The carrying case 30 is typically worn on the hip and includes a recessed cavity 32 with support members 34, 36. Mounted within cavity 32 and to the interior side of support member 36 is a magnet 38. A typical magnet which may be used in the invention is Dexter Ser. No. 5905359X01 or the like. Magnet 38 is sized to fit within cavity 32 while still allowing radio 10 also to fit within the cavity without obstruction. Magnet 38 is specifically positioned so when radio 10 rests within carting case 30, the hall effect switch 14 is aligned with the magnetic field emitted by magnet 38. This works to activate hall effect switch 14 when in position. When the switch is activated, this directs the microprocessor to change a control function such as providing a greater or high audio output from the radio speaker or DTMF tone pad 13. Conversely, when extracted from carrying case 30, hall effect switch is no longer actuated and speaker volume is at a lower level. This allows the user to more comfortably operate the radio while carried at the hip, in the carrying case 30, while still allowing the radio's use near the face without fear of a loud or overly excessive audio output coming unexpectedly from the speaker. Thus, the radio senses its position within carrying case 30 freeing the user from the burden of constantly adjusting the radio's control functions such as audio output.

Figure 3:
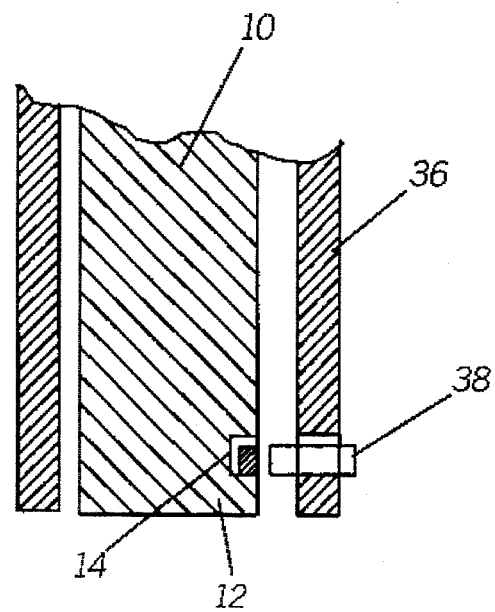
FIG. 3 is a side cross-sectional view of the radio inserted within the carrying case.

FIG. 3 is a side cross-sectional view of the radio 10 positioned at rest within the carrying case 30 taken along section lines III—III shown in FIG. 2. Contrary to FIG. 2, FIG. 3 depicts radio 10 inserted within case 30. Hall effect switch 14 is shown in alignment with magnet 38. As an example, in this position the audio output of the radio may be controlled to increase above that which is used when the radio is outside of its case.

Figure 4:
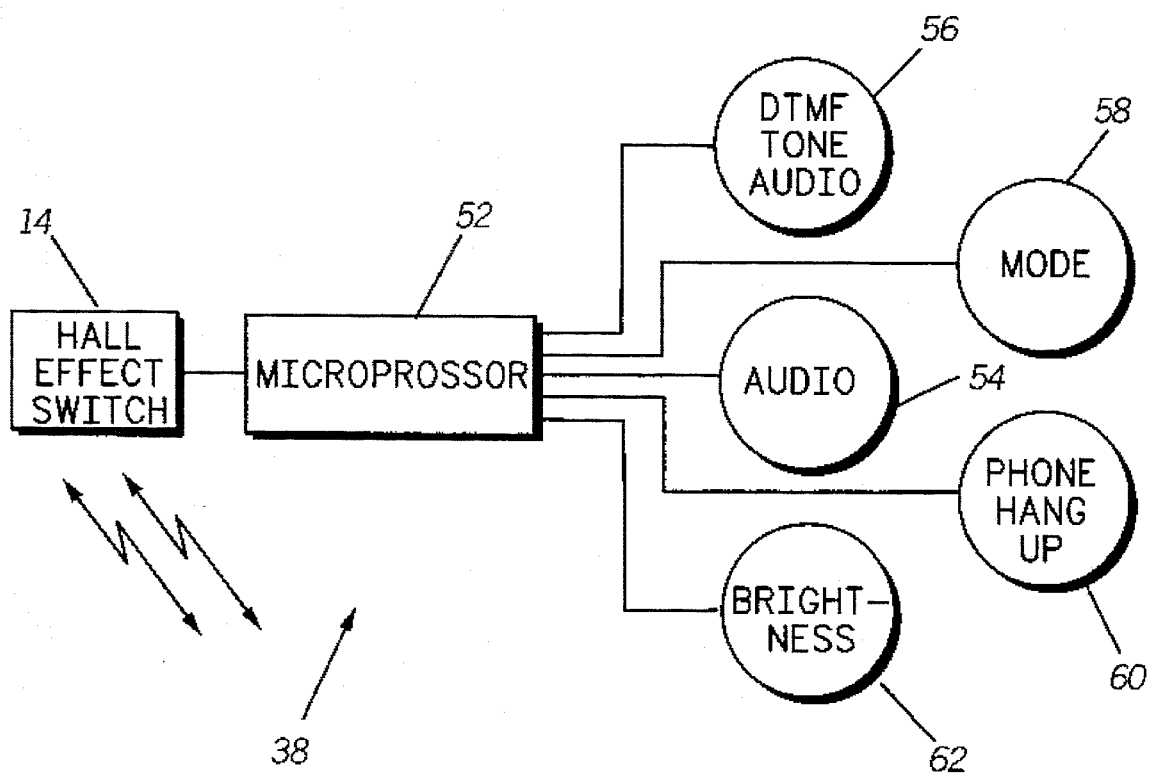
FIG. 4 is block diagram of a hall effect switch showing its connection to the audio section of the radio shown in FIG. 1.

FIG. 4 is block diagram of the hall effect switch 14 used in the radio 10. Hall effect switch 14 is typically a semiconductor device which is activated when in position of a magnetic field such as provided by magnet 38. Whether the hall effect switch 14 is activated or deactivated it is detected by microprocessor 52. The microprocessor 52 then may be used to control the audio section 54, DTMF audio tone levels 56, mode of operation 58, telephone hang-up 60 or light brightness 62.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An apparatus for sensing the position of a portable radio within a carrying case comprising:

a hall effect switch attached to a portable radio for controlling the audio level from a speaker within said portable radio; and at least one magnet located with said carrying case for actuating said hall effect switch when said switch is in proximity to said magnet to adjust the audio level from said speaker from a fist audible level to a second audible level.

2. An apparatus according to claim 1, wherein said hall effect switch is connected to a microprocessor located within said radio.

3. An apparatus for controlling the audio output level of a portable radio comprising:

at least one hall effect switch attached to the radio for controlling the level of audio output between a first audible level and a second audible level;

at least one magnet means attached to a carrying case for actuating said hall effect switch, said carrying case sized to fit said radio.

4. An apparatus according to claim 3, wherein said at least one magnet means is aligned with said hall effect switch when said radio is inside said carrying case.

5. An apparatus according to claim 3, wherein said level of audio output is greater when said radio is inserted within said carrying case.

6. An apparatus according to claim 3, wherein said at least one hall effect switch also controls the audio level heard from a DTMF tone pad located on said radio.

7. A carrying case used with a portable radio comprising:

a housing including a support surface and a plurality of frictional support members for securing said radio to said support surface; and at least one magnet attached to at least one of said frictional support members for providing a magnetic field to actuate a hall effect switch located within said radio wherein said hall effect switch controls the audible level of said radio is speaker between a first audible level and a second audible level.

8. A carrying case according to claim 7, wherein said magnet is substantially aligned with said hall effect switch when said radio is positioned within said frictional support members.

9. A method of automatically adjusting the audio level of a portable radio between first audible level and a second audible level when using the radio with a radio carrying case comprising the steps of:

positioning a hall effect switch within said radio for controlling a microprocessor;

moving said radio into a magnetic field located within said carrying case;

actuating said hall effect switch in response to said magnetic field; and signaling the microprocessor of the portable radio upon actuation of said hall effect switch where said microprocessor adjusts the audio level to said first audible level when said portable radio is removed from said carrying case and to said second audible level when said portable radio is inserted within said carrying case.

10. A method according to claim 9, wherein said microprocessor further adjusts the audio tone level of a DTMF tone pad located on said radio.

11. A method according to claim 9, wherein said microprocessor further adjusts the illumination level of internal lighting of said radio.

12. A method according to claim 9, wherein said microprocessor further altering the mode of operation of the radio.

13. A method according to claim 9, wherein said moving step further includes the step of substantially aligning said hall effect switch with at least one magnet located within said carrying case.

* * * * *